D. K. ALLISON.
DEVICE FOR SPACING DOUGH BALLS.
APPLICATION FILED SEPT. 27, 1916.
1,291,353.
Patented Jan. 14, 1919.
2 SHEETS—SHEET 1.
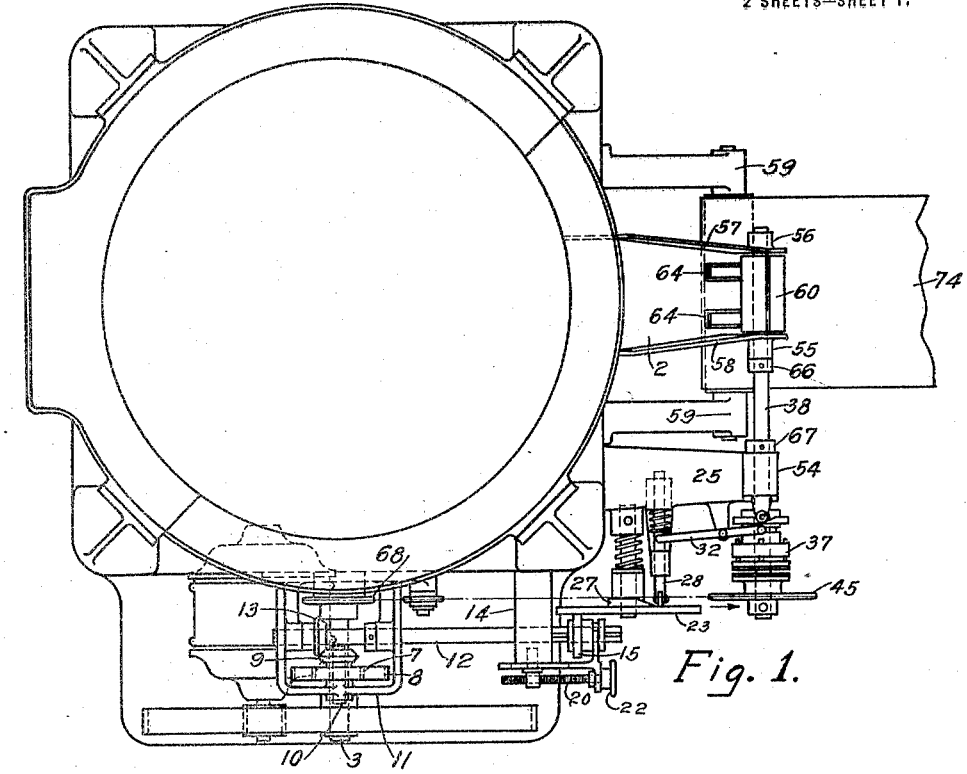
Fig. 1.
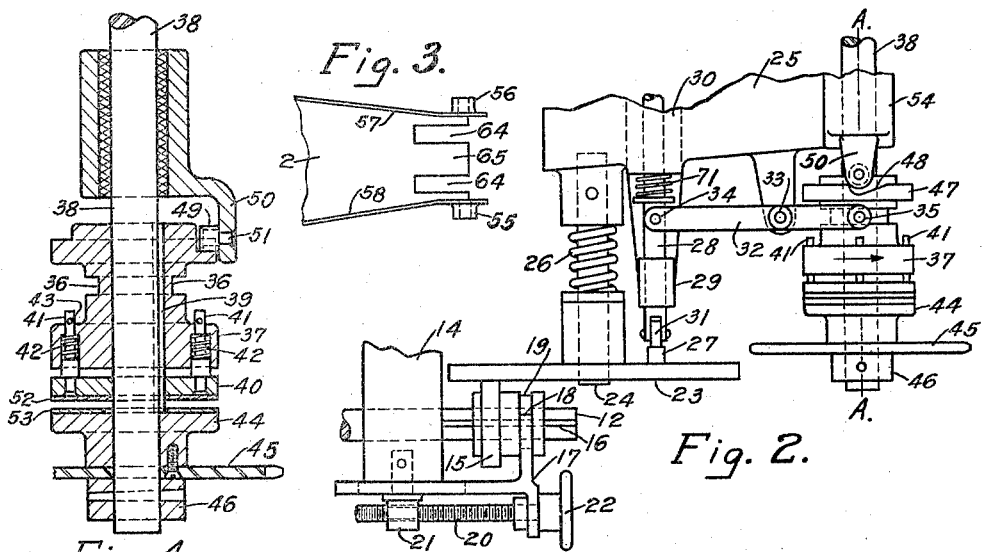
Fig. 3.
Fig. 4.
Fig. 2.
Witnesses.
Inventor.
Daniel K. Allison

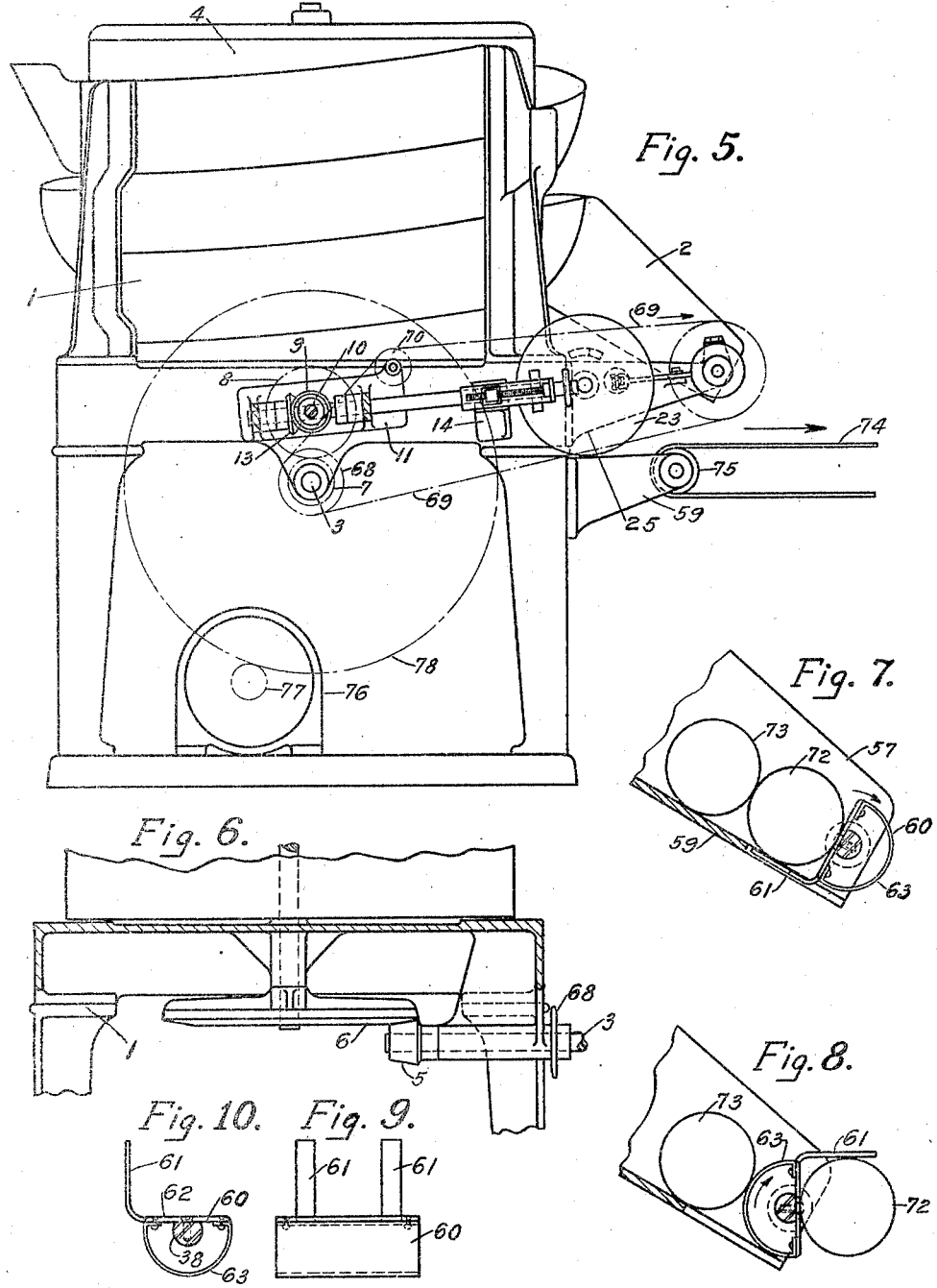

UNITED STATES PATENT OFFICE.

DANIEL K. ALLISON, OF CINCINNATI, OHIO, ASSIGNOR TO THE J. H. DAY COMPANY, OF CINCINNATI, OHIO, A CORPORATION OF OHIO.

DEVICE FOR SPACING DOUGH BALLS.

1,291,353. Specification of Letters Patent. Patented Jan. 14, 1919.

Application filed September 27, 1916. Serial No. 122,342.

*To all whom it may concern:*

Be it known that I, DANIEL K. ALLISON, a citizen of the United States, residing at Cincinnati, in the county of Hamilton and State of Ohio, have invented a certain new and useful Device for Spacing Dough Balls, of which the following is a specification.

My invention relates to machines for separating dough masses or balls as they are being discharged from a dough baller and for depositing them upon a traveling conveyer in a manner that they will be uniformly spaced thereon.

It is the practice at present to feed masses of dough into a baller either by hand or by a conveyer belt. In either case it has been found impracticable to deposit dough masses into a baller with regularity, so that however carefully they may be deposited, they will discharge from the baller in haphazard order—without uniform spacing between them—some of them being very close together, others far apart. A method of treating dough has come into practice recently which, for its successful operation, requires that the balls of dough be discharged from the baller at uniform intervals so that they may be deposited on a conveyer belt with uniform spacing between them. By this new practice the balls of dough are conveyed to a dough molder, into which they are discharged automatically. The uniform spacing of the dough balls upon the conveyer belt is necessary to enable the molder to mold the dough balls into separate loaves. Therefore, in order to discharge the dough balls from the baller at uniform intervals of time, so that they may be uniformly spaced upon a conveyer belt beneath, I have provided means, located in the discharge spout of the baller, for arresting the travel of the said dough balls and for separating them, one at a time, from the others, and depositing them upon the traveling belt beneath. Referring to the drawings, Figure 1, represents a plan view of my device applied to a dough baller. Fig. 2 is an enlarged plan view of part of Fig. 1. Fig. 3 is a plan view of the discharge spout of the baller. Fig. 4 is an enlarged section of Fig. 2 on line A—A. Fig. 5 is a side elevation of a dough baller showing my improved spacing device connected thereto. Fig. 6 is a partial vertical section cut centrally through the baller frame. Fig. 7 is a vertical section through the discharge spout of the baller. Fig. 8 is a similar section. Fig. 9 is a plan view of the separator 60. Fig. 10 is an end view of the separator 60.

1 represents a dough balling machine. 2 represents the discharge spout of said dough balling machine. 3 is a drive shaft of said machine which communicates power to the cylinder 4 through the bevel gears 5 and 6. Shaft 3 has spur gear 7 keyed to it, which meshes into and drives spur gear 8. Integral with said spur gear 8 is a miter gear 9. Gears 8 and 9 are loosely mounted upon stud 10 which is supported by frame 11. Shaft 12 is mounted in frame 11 and is driven by miter gear 13 which meshes with gear 9. Bracket 14 also provides a bearing for shaft 12. Mounted upon shaft 12 is a friction roller 15 which is driven by said shaft by means of a sliding key working in spline 16. Frame 17 is provided with a forked end 18 arranged to fit groove 19 in the hub of friction roller 15. Said frame is also provided with a suitable adjustment screw 20 working in nut 21, and a handwheel 22 by means of which the friction roller 15 may be made to slide longitudinally on shaft 12. Friction roller 15 may be made of any suitable material so that said roller may communicate power by frictional contact with the surface of the circular disk 23. I prefer to make said roller 15 of leather. Disk 23 is rotatably mounted upon the stud 24, which stud is secured in bracket 25, which said bracket is bolted to the framework of the said baller. The spring 26 exerts pressure against the said disk, thereby keeping the disk in frictional contact with roller 15 at all times. The rear surface of said disk 23 is provided with a cam projection 27 which is used for the purpose of inducing longitudinal motion in the shaft 28. This shaft 28 is mounted in the bracket 25 and is free to move longitudinally in suitable bearings 29 and 30. Shaft 28 is provided with an anti-friction roller 31 which said roller travels over the surface of the cam projection 27. Lever 32 is fulcrumed at 33 and is pivotally connected at the point 34 to shaft 28. At its opposite end the lever 32 is forked and provided with studs 35—35 which fit in the groove 36 of the clutch sleeve 37. Said clutch sleeve 37 is splined to shaft 38 as indicated at 39 in Fig. 4, but is free to move longitudinally thereon.

Said clutch sleeve carries a ring 40 pinned thereto by a plurality of pins 41. Pins 41 are provided with springs 42 which serve to keep ring 40 a predetermined distance from the said sleeve 37 which distance may be limited by cotter pins or any other suitable means as indicated at 43. Said ring 40, while capable of moving longitudinally, is kept under pressure in a longitudinal direction by means of said springs 42 so that any force exerted upon ring 40 directed toward clutch sleeve 37 will be resisted by springs 42. Loosely mounted upon shaft 38, adjacent to ring 40 is the disk 44. Secured to this disk 44 is a sprocket wheel 45, both sprocket wheel and disk being arranged to rotate freely on said shaft 38. A collar 46 serves to keep said disk 44 in proper position upon said shaft 38. Clutch sleeve 37 is provided with an annular flange 47 which is integral with said clutch sleeve. Flange 47 is recessed at 48 to fit roller 49 which is secured to projection 50 by means of stud 51. The recess 48 is cut away on one side as shown in Fig. 2 to make an easy approach for the roller. The roller 49 is stationary but capable of rotating upon its stud 51 and when it is deep in the recess 48, as shown in Fig. 1, it prevents clutch sleeve 37 from rotating. The direction of rotation of clutch sleeve 37 is shown by arrow in Fig. 2. Ring 40 and disk 44 have their adjacent surfaces provided with leather or any other suitable material as indicated at 52 and 53. Shaft 38 is rotably mounted in bearing 54 of bracket 25 and bearings 55 and 56 cast on the discharge spout of the baller. Secured to this shaft and located between the sides 57 and 58 of the discharge spout 2 of the baller is the separator 60. The separator 60 is composed of the two projecting fingers 61—61, the flat plate 62 and the semicylindrical surface 63,—see Figs. 9 and 10. To permit said separator to rotate with the shaft 38, the discharge spout 2 is cut out at the discharge point as indicated at 64—64. The bottom of the spout is made to extend between the said fingers 61 as indicated by 65. Collars 66 and 67 keep shaft 38 against end thrust. Sprocket wheel 45 is driven by sprocket wheel 68 through chain 69. Sprocket wheel 68 is keyed to shaft 3 and rotated with it. Idler sprocket 70 is used to direct the course of said chain 69.

The operation of my device is as follows: Power is applied to the shaft 3 in any suitable manner. In the drawings I have preferred to drive shaft 3 by means of spur gear 78 and pinion 77 which receive their power through the electric motor 76. Shaft 3 causes the cylinder 4 to rotate through bevel gears 5 and 6. Small masses of dough of uniform weight are discharged into the baller 1, by means of which they are shaped and molded into a spherical form and are finally rolled into the discharge spout 2 in consecutive positions as indicated by the circles 72 and 73 in Fig. 7. Thus far the operation and the means therefor are old. Fig. 7 shows the separator 60 in a position of rest, the dough ball 72 being arrested thereby and held in a stationary position. In its operation the separator 60 rotates with the shaft 38 in the direction of the arrow, thereby causing the fingers 61—61 to lift the dough ball 72 and separate it from the dough ball 73. During this cycle of operation the dough ball 72 assumes the position as indicated in Fig. 8 from which it falls onto a conveyer or belt 74 beneath, such conveyer belt being shown in Fig. 1. Said conveyer belt 74 may be mounted in any suitable manner, but I have preferred to arrange it to travel over roller 75 journaled in bearings 59—59 attached to the frame of the baller. At the same time dough ball 73 rolls down the discharge spout 2 until its progress is arrested by the semi-cylindrical surface 63 of the separator 60. The extension 65 in the bottom of the discharge spout serves to keep the dough balls from falling out of the spout during the rotation of the separator 60. The separator 60 does not rotate continuously, but on the contrary, in its operation it makes a complete revolution about its axis and then rests for a short interval in the position as is shown in Fig. 7. After each complete rotation of the separator 60 there is a period of rest, so that I elect to call the movement of said separator intermittent rotation. I have found by experiment, that separating balls of dough, where they are in actual contact with each other, can be done more successfully by having the separator 60 rotate with high velocity. It is not necessary that this velocity be varied or altered to suit the number of loaves discharged by the baller in a unit of time, as it is desirable to separate and discharge the balls of dough from the baller discharge spout at the same velocity whether there be few or many discharged in a unit of time. When the baller is discharging a great many loaves in a unit of time, the rest periods of the separator will be shortened, and when the baller is discharging a small number of loaves in a unit of time, the rest period will be accordingly lengthened. It is desirable to have the rotations of shaft 38 and separator 60 correspond to the number of dough balls discharged in a unit of time; so that each ball of dough, as it is discharged from the baller, may be promptly separated and deposited on the conveyer belt beneath. The mechanism which drives the shaft 38 is comprised of the clutch sleeve 37, the ring 40, the disk 44 and sprocket wheel 45. I will elect to call these parts a clutch. When the clutch sleeve 37 is moved toward the clutch disk 44 by the movement of the lever 32, the friction surfaces 52 and 53 cause the clutch sleeve 37 to be rotated in the direction indicated by the arrow, in Fig. 2. After clutch sleeve 37 has been moved far enough to bring surfaces 52 and 53 in actual contact, it is necessary that said clutch sleeve have an additional movement in the same direction in order to allow the recess 48 of the flange 47 to pass the roller 49. The springs 42—42 permit this extra movement of the clutch sleeve 37 and at the same time exert the force which keeps the surfaces 52 and 53 in frictional contact. After clutch sleeve 37 has rotated sufficiently to allow the recess 48 to pass out of line with roller 49, the side of the flange 47 will ride against said roller 49 and thereby keep the springs 42—42 under compressive action and the surfaces 52 and 53 into frictional contact, while said clutch sleeve and coöperating parts are making one complete revolution. When one revolution is completed the clutch sleeve 37 will be thrown back, and the roller 49 will roll into the recess 48 which will bring the clutch sleeve 37 to a state of rest. The backward movement of the clutch sleeve 37 is actuated by the spring 71 operating upon the shaft 28 and the lever 32. The movement of the lever 32 when throwing the clutch sleeve 37 into action, is caused by the cam 27 on the back of the disk 23. This cam need not be any longer than is sufficient to hold clutch sleeve 37 in action until the recess 48 passes out of line of the roller 49. It will be noted that the shaft 38 and separator 60 rotate the same number of times as the disk 23 in a unit of time. Therefore, the regulation of the rotations of the separator 60 to correspond with the number of dough balls discharged from the baller in a unit of time is accomplished by the handwheel 22 and coöperating parts. When it is desirable to have the separator 60 make a small number of operations in a unit of time the friction roller 15 is moved toward the periphery of the disk 23 and, vice-versa, it is moved toward the axis of said disk 23 to increase the number of rotations of the separator 60. As is said heretofore friction roller 15 receives its motion through shaft 12, bevel gears 13 and 9, spur gears 8 and 7, from the shaft 3. Shaft 38 and separator 60 receives their rotative motion through sprocket wheel 68, chain 69 and sprocket wheel 45.

Having thus described my invention I claim:—

1. In a spacing device for dough masses a rotatable separator operating about a horizontal axis and having means for arresting the progress of dough balls when the separator is at rest comprising a flat surface extending across the path of the dough balls and at a right angle thereto and also provided with a single row of projecting fingers extending beneath the path of the dough balls when the separator is at rest and arranged when in motion to lift a single dough ball out of its inclined path and deposit it onto a traveling belt, together with means for imparting separate complete rotations to said separator intermittently.

2. In a spacing device for dough masses, a separator, means for rotating said separator periodically and at an invariable velocity and means for varying the frequency of the rotation periods of said separator.

3. In a spacing device for dough masses, a separator, means for actuating said separator intermittently and at a constant velocity and means for varying the length of the intermissions between the actuations of the said separator.

DANIEL K. ALLISON.

Witnesses:
 Wm. Hust,
 R. Hooge.

Copies of this patent may be obtained for five cents each, by addressing the "Commissioner of Patents, Washington, D. C."